United States Patent Office 3,488,286
Patented Jan. 6, 1970

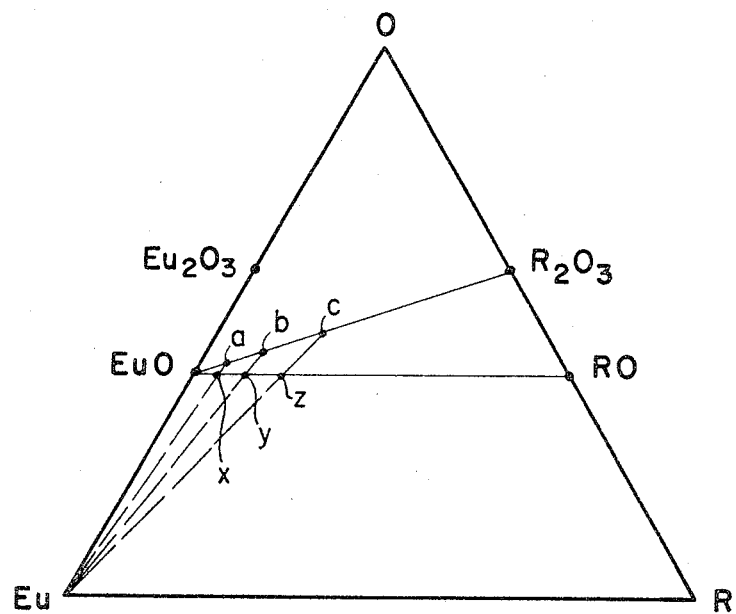
INVENTORS
FREDERIC HOLTZBERG
MERRILL W. SHAFER
ATTORNEY

3,488,286
METHOD OF PRODUCING HIGH CURIE TEMPERATURE EuO SINGLE CRYSTALS
Frederic Holtzberg, Pound Ridge, and Merrill W. Shafer, Yorktown Heights, N.Y., assignors to International Business Machines Corporation, Armonk, N.Y., a corporation of New York
Continuation-in-part of application Ser. No. 666,517, Sept. 8, 1967. This application Aug. 1, 1968, Ser. No. 749,505
Int. Cl. C04b 35/50; H01f 1/34
U.S. Cl. 252—62.51
15 Claims

ABSTRACT OF THE DISCLOSURE

New ferromagnetic materials having the formula $$(Eu_{1-x}R_x)O$$

where $0.002 < x < 0.12$ and R is selected from one of the rare earth elements are prepared. The new materials are prepared by heating a mixture of EuO and a trivalent rare earth sesquioxide under Eu pressure in a sealed refractory metal container such as molybdenum or tungsten. The resulting products, having the above formula, are pure single phase crystals having increased electrical conductivity and Curie temperatures in excess of 130° K. These new materials are used in magneto-optical and memory devices.

---

This application is a continuation-in-part of copending patent application Ser. No. 666,517, filed Sept. 8, 1967, now abandoned.

BACKGROUND OF THE INVENTION

Field of the invention

This invention relates to the preparation of new ferromagnetic materials; more specifically to the preparation of pure single phase crystals of ferromagnetic materials having the formula $(Eu_{1-x}R_x)O$, where $0.002 < x < 0.12$ and R is a rare earth element selected from the group consisting of lanthanum (La), gadolinimum (Gd), holmium (Ho), yttrium (Y), praseodymin (Pr), cerium (Ce), neodymium (Nd), terbium (Tb), erbium (Er), lutetium (Lu), scandium (Sc), dysprosium (Dy) and thulium (Tm).

DESCRIPTION OF THE PRIOR ART

With the discovery of ferromagnetism in europium chalcogenides, divalent europium oxide (EuO) has been considered an attractive material for use in magneto-optic and memory devices. Divalent europium oxide exhibits a high magnetic moment, e.g., saturation moments about 230 cm.$^3$-oe./gm. A limiting factor in the use of EuO in a magnetic device environment, however, is its relatively low Curie temperature ($T_c$) which limits its use at convenient operating temperatures. For example, EuO exhibits a $T_c$ of 69.5° K., thus cannot be conveniently operated at, say, liquid nitrogen temperatures, i.e., 77° K. It would be advantageous to produce a EuO having a $T_c$ in excess of 77° K. and which at the same time maintains its high magnetization and high Faraday and Kerr rotation along with its stability and transparency.

Recently, it has been discovered that the $T_c$ of EuO could be increased to values ranging from 69.5° to 134° K. by reacting a trivalent rare earth chalcogenide other than an oxide with EuO. Reference is made to copending patent application Ser. No. 428,862, filed on Jan. 28, 1965, now Patent No. 3,371,042 in the names of Thomas B. McGuire and Merrill W. Shafer, entitled "Ferromagnetic Materials," and assigned to the assignee of this invention. The prepared compounds in the above patent application Ser. No. 428,862 required upwards to 20 mol percent of the rare earth chalcogenides to obtain a measurable increase in the $T_c$ of EuO. Since less than 1% of the chalcogenides is dissolved in EuO, the products obtained by the method of the above stated patent application are not single phase EuO. Because of the dilution of the ferromagnetic phase (EuO) with a conducting paramagnetic second phase material (divalent rare earth chalcogenides other than oxides), the magnetic moment of the EuO is decreased measurably. For example, at 4.2° K. the magnetization of the resultant material containing this paramagnetic phase is 170 cm.$^3$-oe./gm., compared to 230 for pure EuO. The Faraday and Kerr rotation is also lowered proportionately. Additionally, the multiphase material is more opaque than the EuO due to the paramagnetic phase. Thus, light is scattered by the paramagnetic phase and the useful rotation is actually decreased.

Single crystals of EuO have been prepared by heating EuO with Eu metal. Reference is made to copending patent application Ser. No. 483,712 now U.S. Patent No. 3,370,924, in the names of Carl F. Guerci and Merrill W. Shafer, entitled "Method of Making Crystals of Rare Earth Chalcogenides," filed on Aug. 30, 1965 and assigned to the assignee of this invention. The resulting EuO crystals were found to be pure, have a high degree of perfection, and high saturation magnetizations at low temperatures. However, the Curie tempearture of the crystalline material was about 80° K., thus at 77° K. the magnetization was too low to be useful in devices. Similarly, it was shown in the above mentioned application Ser. No. 483,712 that reacting EuO with a rare earth sesquioxide in the absence of Eu metal did not increase the Curie temperature of EuO.

U.S. Patent No. 3,371,041, to F. Holtzberg et al. and assigned to the assignee of this invention, discloses a method of preparing solid solutions having the general formula $Eu_{1-x}R_xO$. These materials are prepared by heating a mixture of EuO with a 1:1 trivalent rare earth metal chalcogenide. The materials are found to have a Curie temperature of about 85° K. Thus, like compositions of the above patent application Ser. No. 483,712, they are not useful in magneto-optical devices. Thus, while these materials which are useful as high frequency transformers, memory cores, etc., they are of little use in magneto-optical applications.

Obviously, it would be desirous of having EuO compositions with high Curie temperatures, provided in the above stated application Ser. No. 428,862, and at the same time maintain the high magnetic moments and the high optical transparency of pure EuO. To obtain such results, it is necessary that the EuO material be single phased and have no grain boundaries which also scatter light. In other words, it is very desirable to have pure single crystals with high Curie temperatures.

Summary of the invention

The present invention is directed to the preparation of pure single phase EuO compositions in single crystal form which exhibit Curie temperatures in the range of 114° K. to 140° K. and which have saturation magnetizations of from 140 to 175 gauss cm.³/gm. at 77° K. A mixture comprising EuO, elemental Eu and a rare earth sesquioxide, having the general formula $R_2O_3$, is heated at a temperature range of from 1800° C. to 2200° C. in a sealed molybdenum container and slowly cooled. The resulting product has the general formula $$(Eu_{1-x}R_x)O$$

where $0.002 < x < 0.12$ and R is selected from La, Gd, Ho, Y, Ce, Pr, Sc, Nd, Tb, Dy, Er, Tm and Lu. R is present in less than 12 mol percent of the final product.

It is an object of this invention to provide a new series of europium compounds in single crystal form exhibiting a Curie temperature in the range of from 114° K. to 140° K.

Another object of this invention is to prepare a material exhibiting a high saturation magnetization and having a Curie temperature between 114° K. and 140° K.

Another object of this invention is to provide a single crystal ferromagnetic material having the formula $(Eu_{1-x}R_x)O$ where R is a rare earth element other than Eu.

The foregoing and other objects, features and advantages of the invention will be apparent from the following more particular description of a preferred embodiment of the invention as illustrated in the accompanying drawing and examples.

The figure represents the ternary system Eu—R—O.

The novel compounds of this invention are prepared by homogeneously mixing appropriate predetermined quantities of the base europium oxide, (e.g., about 50–96 mol percent), elemental europium (e.g., about 2–30 mol percent), and a rare earth sesquioxide (e.g., about 2–30 mol percent), where the rare earth element is selected from the group consisting of lanthanum, praseodymium, neodymium, gadolinium, cerium, dysprosium, terbium, holmium, erbium, thulium, yttrium, scandium and lutetium. The EuO, the eruopium metal and the rare earth sesqioxide thus mixed, are heated under a Eu pressure to a reaction temperature of from about 1750° C. to about 2200° C. in a sealed molybdenum container. The mixture is heated in the described temperature range in excess of 1 hour so as to insure reaction of the base EuO material and the sesquioxide. When cooled, the high saturation magnetization properties of EuO are retained, but it exhibits a Curie temperature in the range of from 114° K. to 140° K. The final materials may be used in magneto-optical and memory devices.

The above process produces single crystals of EuO containing excess Eu and a rare earth element other than Eu. The single crystals grow on the surface of a polyphase mixture and are easily removed. An analysis of these crystals shows them to be single phase with Curie temperature values the ranges of 114–140° K. They have a magnetization of about 170 cm.³-oe./gm. at 77° K. or 75% of the theoretical value (which is obtained by extrapolation to 0° K.) and resistivities lower than that of pure europium oxide, i.e., in the range of $10^1$ to $10^3$ ohms/cm. at 298° K. as compared with about $10^7$ ohms/cm. for the pure EuO. These crystals have melting points of about 2000° C.±50° C. under a pressure of europium metal. They are deep red to violet in color and have densities of about 8.18±0.01 (theoretical density is 8.190). The crystals produced exhibit the symmetrical rock salt structure. An X-ray analysis of the materials prepared discloses similar lattice spacings thereof. The pattern is shown in the following Table I:

TABLE I

| Line | d | I | hkl |
|---|---|---|---|
| | | $I_0$ | |
| 1 | 2.97 | 85 | 111 |
| 2 | 2.57 | 100 | 200 |
| 3 | 1.82 | 65 | 220 |
| 4 | 1.55 | 45 | 311 |
| 5 | 1.485 | 25 | 222 |
| 6 | 1.285 | 20 | 400 |
| 7 | 1.180 | 20 | 331 |
| 8 | 1.150 | 15 | 420 |

$a. = 5.146$.

These lattice spacings do not change appreciably with the different rare earth sesquioxides, since the amount of the sesquioxides entering into the EuO lattice is too small to be detected by normal X-ray techniques.

The compositions of the invention can further be described in terms of the ternary system Eu—R—O shown in the accompanying figure. It is desirable that compositions be prepared along the join EuO—RO as is the case of the other chalcogenide systems. In these cases the trivalent R chalcogenides (S, Se, Te) have the same structure as the divalent europium chalcogenides and solid solutions having a variety of resistivities can be prepared. In the oxide systems, trivalent RO compounds do not exist as stable species under ordinary conditions so the final compositions must be obtained by other methods i.e., forming them by a reaction involving other starting materials. The starting materials in the case of this invention are EuO, $R_2O_3$ and Eu metal. With reference to the ternary diagram, the compositions can be defined as mixtures of EuO and $R_2O_3$ (along the join connecting those compositions) to which various percentages of Eu metal are added. For example, the points a, b, and c are three different compositions containing EuO and $R_2O_3$. The reaction between the two end members, EuO and $R_2O_3$, is not sufficient to form the desired product since there is very little solubility of $R_2O_3$ in EuO. When Eu metal is added to the EuO—$R_2O_3$ mixtures, the final compositions move away from the EuO—$R_2O_3$ join toward the EuO—RO join as shown by the points x, y, z in the figure. Thus, it is seen that in order to produce high Curie temperature single phase materials, it is essential that the final compositions fall below the EuO—$R_2O_3$ join, i.e., along, or slightly above, the EuO—RO join. The compositions formed along the EuO—RO join can be written as $(Eu_{1-x}R_x)O$.

The EuO used in this invention was prepared by reacting $Eu_2O_3$ with Eu metal according to the following reaction: $Eu_2O_3 + Eu \rightarrow 3EuO$. The excess Eu metal used is subsequently distilled off. The details of this method of preparing pure EuO are thoroughly discussed in an article appearing in the "Journal of Applied Physics," vol. 36, No. 3, part 2, March 1965, by M. W. Shafer and is incorporated herein. The Eu metal and $Eu_2O_3$ used are commercially available in highly pure form.

The following examples are given by way of illustration and not by limitation.

Example I

Eighty-five (85) mol percent of EuO, 10 mol percent of europium metal and 5 mol percent of $La_2O_3$ are blended by a mechanical shaker into a finely divided powder to obtain a homogeneous mixture. The mixture is placed in a refractory metal crucible, e.g., molybdenum or tungsten, etc., which is evacuated and sealed. The crucible containing the mixture is then heated to a temperature of from about 1900° C. to about 2200° C. and is subsequently cooled slowly. The resultant single crystals have a room temperature resistivity of $6 \times 10^2$ ohm-cm., a Curie temperature of 132° K. and a saturation magnetization of 170 cm.³-oe./gm. The concentration of the lanthanum sesquioxide in the crystal was found to be 0.4±0.2 mol percent.

Other ferromagnetic materials of this invention have been prepared in accordance with the following Table II where the following compositions are given by mol percent unless otherwise specified and were reacted as in Example I above to obtain the indicated Curie temperature.

TABLE II

| Example No. | Starting Composition, parts by mol | | | Reaction Temperatures, °C. | Final R Concentration (mol percent) | Room Temp. Resistivity (ohm-cm.) | $T_c$, °K. | Saturation Magnetization oe.-cm.$^3$/gm. at 77° K. |
|---|---|---|---|---|---|---|---|---|
| | $R_2O_3$ | Eu | EuO | | | | | |
| 1 | $Gd_2O_3$ | | | | | | | |
| 2 | 2 | 4 | 94 | 1,900–2,200 | | $2 \times 10^2$ | 135 | 173 |
| 3 | 5 | 10 | 85 | 1,900–2,200 | 3.4±0.5 | $2 \times 10^2$ | 140 | 170 |
| 4 | 10 | 5 | 85 | 1,900–2,200 | 7.8±0.3 | | | 163 |
| | $Ho_2O_3$ | | | | | | | |
| 5 | 5 | 10 | 85 | 1,900–2,200 | 5.0±0.2 | $4 \times 10^2$ | 134 | 172 |
| 6 | 8 | 10 | 82 | 1,900–2,200 | | $2 \times 10^2$ | | 162 |
| | $Y_2O_3$ | | | | | | | |
| 7 | 8 | 10 | 82 | 1,900–2,200 | 6.0±0.3 | $5 \times 10^2$ | 114 | 158 |
| | $Sc_2O_3$ | | | | | | | |
| 8 | 5 | 30 | 65 | 1,750–2,150 | 4.0±0.4 | $7 \times 10^2$ | 120 | 170 |
| | $Er_2O_3$ | | | | | | | |
| 9 | 20 | 10 | 70 | 1,850–2,200 | 6.5±0.5 | $3 \times 10^2$ | 132 | 164 |
| | $La_2O_3$ | | | | | | | |
| 10 | 8 | 7 | 85 | 1,900–2,200 | 0.4±0.2 | $6 \times 10^2$ | 132 | 170 |

As noted in the above Table II, the crystals have saturation magnetizations of about 170 oersteds-cm.$^3$/gm. at 77° K. This should be compared with 232 oe.-cm.$^3$/gm., the 0° K. saturation moment ($M_s$) of pure EuO. Kerr rotations going from $+M_s$ to $-M_s$ with fields of 15K oe. have been measured on clean surfaces at a wavelength of 500 millimicrons and at 80° K. If compared to pure EuO, it is necessary to cool it to 18° K. to obtain the same rotation. Thus, by the addition of a rare earth sesquioxide to EuO, it is possible to utilize the high Faraday and Kerr rotations of EuO in magneto-optical and memory devices at nitrogen temperature (77° K). The results of this invention show that contrary to the prior art, trivalent rare earths can be substituted into EuO causing an increase in the Curie temperature thereof. The presence of the excess europium metal in the preparation of these materials is believed to do two things: (1) it prevents the dissociation of EuO and the subsequent formation of a trivalent phase into which the sesquioxide would preferentially substitute; (2) it may lead to a reaction such as $Eu + R_2O_3 \rightleftharpoons 3(EuR)O$, where the normally unstable reaction product (EuR)O is stabilized by the EuO which accepts it into the lattice and allows the reaction to proceed in the direction indicated. As a consequence, the trivalent rare earth in the EuO lattice is able to furnish an electron which sharply lowers the resistivity and enhances the ferromagnetic exchange interaction. Since lanthanum, which is dissolved into the EuO lattice by an order of magnitude less than holmium and gadolinium (Table II), produces the same increase in the Curie temperature, it appears that only small concentrations (0.5%) of the trivalent rare earth metal are necessary. This is further supported by the fact that a number of different trivalent rare earth ions, in widely different chemical systems, all produce similar Curie temperature increases.

Because of the similar chemical properties of the remaining reactants ($R_2O_3$), it is clear that similar single phase crystals of EuO and any of the rare earth sesquioxides will give corresponding increases in Curie temperature.

While the invention has been particularly described with reference to a preferred embodiment thereof, it will be understood by those skilled in the art that various changes in form and detail may be made therein without departing from the spirit and scope of the invention.

What is claimed:

1. A single phase crystal ferromagnetic material having the formula $(Eu_{1-x}R_x)O$, where $0.002 < x < 0.12$ and R is an element selected from the group consisting of lanthanum, gadolinium, cerium, holmium, yttrium, praseodymium, promethium, neodymium, terbium, erbium, lutetium, scandium, dysprosium and thulium, said ferromagnetic material having a Curie temperature between about 114° C. to about 140° C. and prepared by:

(a) homogenously mixed EuO, elemental Eu and a trivalent metal sesquioxide of said element R;
   (b) heating said mixture to a temperature range of about 1750° C. to about 2200° C. in a sealed refractory metal container to react said EuO with said sesquioxide; and
   (c) slowly cooling said reaction mixture to room temperature, to thereby obtain pure single crystals of $(Eu_{1-x}R_x)O$.

2. A single phase crystal ferromagnetic material having the formula $(Eu_{1-x}La_x)O$ where $0.002 < x < 0.12$, said ferromagnetic material having a Curie temperature between about 114° C. to about 140° C. and prepared by:

(a) homogenously mixing EuO, elemental Eu and $La_2O_3$;
   (b) heating said mixture to a temperature range of about 1750° C. to about 2200° C. in a sealed refractory metal container to react said EuO with said $La_2O_3$; and
   (c) slowly cooling said reaction mixture to room temperature, to thereby obtain pure single crystals of $(Eu_{1-x}La_x)O$.

3. A single phase crystal ferromagnetic material having the formula $(Eu_{1-x}Gd_x)O$, where $0.002 < x < 0.12$, said ferromagnetic material having a Curie temperature between about 114° C. to about 140° C. and prepared by:

(a) homogenously mixing EuO, elemental Eu and $Gd_2O_3$;
   (b) heating said mixture to a temperature range of about 1750 to about 2200° C. in a sealed refractory metal container to react said EuO with said $Gd_2O_3$; and
   (c) slowly cooling said reaction mixture to room temperature to obtain pure single crystals of $$(Eu_{1-x}Gd_x)O$$

4. A single phase crystal ferromagnetic material having the formua $(Eu_{1-x}Ho_x)O$, where $0.002 < x < 0.12$, said ferromagnetic material having a Curie temperature between 114° C. to about 140° C. and prepared by:

(a) homogenously mixing EuO, elemental Eu and $Ho_2O_3$;
   (b) heating said mixture to a temperature range of about 1750° C. to about 2200° C. in a sealed refractory metal container to react said EuO with said $Ho_2O_3$; and
   (c) slowly cooling said reaction mixture to room temperature to obtain pure single crystals of $(Eu_{1-x}Ho_x)O$.

5. A single phase crystal ferromagnetic material having the formula $(Eu_{1-x}Y_x)O$, where $0.002 < x < 0.12$, said ferromagnetic material having a Curie temperature between 114° C. to about 140° C. and prepared by:

(a) homogenously mixing EuO, elemental Eu and $Y_2O_3$;
   (b) heating said mixture to a temperature range of about 1750° C. to about 2200° C. in a sealed refractory metal container to react said EuO with said Y$_2$O$_3$; and (c) slowly cooling said reaction mixture to room temperature to obtain pure single crystals of (Eu$_{1-x}$Y$_x$)O.

6. A single phase crystal ferromagnetic material having the formula (Eu$_{1-x}$Sc$_x$)O, where $0.002<x<0.12$, said ferromagnetic material having a Curie temperature between 114° C. to about 140° C. and prepared by:

(a) homogenously mixing EuO, elemental Eu and Sc$_2$O$_3$;

(b) heating said mixture to a temperature range of about 1750° C. to about 2200° C. in a sealed refractory metal container to react said EuO with said Sc$_2$O$_3$; and (c) slowly cooling said reaction mixture to room temperature to obtain pure single crystals of (Eu$_{1-x}$Sc$_x$)O.

7. A single phase crystal ferromagnetic material having the formula (Eu$_{1-x}$Er$_x$)O, where $0.002<x<0.12$, said ferromagnetic material having a Curie temperature between 114° C. to about 140° C. and prepared by:

(a) homogenously mixing EuO elemental Eu and Er$_2$O$_3$;

(b) heating said mixture to a temperature range of about 1750° C. to about 2200° C. in a sealed refractory metal container to react said EuO with said Er$_2$O$_3$; and (c) slowly cooling said reaction mixture to room temperature to obtain pure single crystals of (Eu$_{1-x}$Er$_x$)O.

8. The method of preparing pure single phase crystals of a ferromagnetic material having the formula (Eu$_{1-x}$R$_x$)O, where $0.002<x<0.12$ and R is a trivalent rare earth element selected from the group consisting of lanthanum, gadolinium, holmium, yttrium, praseodymium, promethium, neodymium, terbium, erbium, lutetium, scandium, dysprosium and thulium, said ferromagetic material having a Curie temperature between about 114° C. to 140° C., comprising the steps of:

(a) homogenously mixing EuO, elemental Eu and a rare earth metal sesquioxide of said metal R;

(b) heating said mixture to a temperature range of about 1750° C. to about 2200° C. in a sealed refractory metal container to react said EuoO with said sesquioxide; and (c) slowly cooling said reaction mixture to room temperature, to thereby obtain pure single crystals of (Eu$_{1-x}$R$_x$)O.

9. A method according to claim 8 wherein said mixture comprises from 50 to 96 mol percent of EuO, 2 to 30 mol percent of said rare earth metal sesquioxide and from 2 to 30 mol percent of Eu metal.

10. A method according to claim 8 wherein said rare earth metal sesquioxide is La$_2$O$_3$.

11. A method according to claim 8 wherein said rare earth metal sesquioxide is Gd$_2$O$_3$.

12. A method according to claim 8 wherein said rare earth metal sesquioxide is Ho$_2$O$_3$.

13. A method according to claim 8 wherein said rare earth metal sesquioxide is Y$_2$O$_3$.

14. A method according to claim 8 wherein said rare earth metal sesquioxide is Sc$_2$O$_3$.

15. A method according to claim 8 wherein said rare earth metal sesquioxide is Er$_2$O$_3$.

References Cited
UNITED STATES PATENTS 3,234,494   2/1966   Matthais _____ 252—62.51 X
3,371,041   2/1968   Holtzberg et al. ____ 252—62.51

ROBERT D. EDMONDS, Primary Examiner

J. COOPER, Assistant Examiner

U.S. Cl. X.R.
23—21, 50, 51